H. C. HODGES.
ROLLER BEARING.
APPLICATION FILED DEC. 27, 1909.

1,024,851.  Patented Apr. 30, 1912.

Witnesses
O. B. Baenziger.
C. C. Jennings

Inventor
Henry C. Hodges.
By Parker & Burton
Attorneys

UNITED STATES PATENT OFFICE.

HENRY C. HODGES, OF DETROIT, MICHIGAN.

ROLLER-BEARING.

1,024,851. Specification of Letters Patent. Patented Apr. 30, 1912.

Application filed December 27, 1909. Serial No. 535,089.

*To all whom it may concern:*

Be it known that I, HENRY C. HODGES, a citizen of the United States, residing at Detroit, county of Wayne, State of Michigan, have invented a certain new and useful Improvement in Roller-Bearings, and declare the following to be a full, clear, and exact description of the same, such as will enable others skilled in the art to which it pertains to make and use the same, reference being had to the accompanying drawings, which form a part of this specification.

This invention relates to roller bearings. It has for its object an improved roller bearing in which the roller is held at one end and allowed to swing at the other end and to roll freely, and thereby the bearing is peculiarly adapted to support an oscillating or rotating member against the end thrust thereof. Such bearings are useful in supporting vertical shafts or arbors, in supporting railway cars upon their bolsters, vehicle bodies on axles, and many other similar constructions in which one body oscillates or rotates with respect to another.

Figure 1:
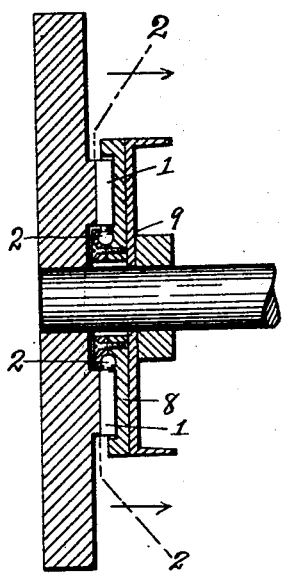
Figure 2:
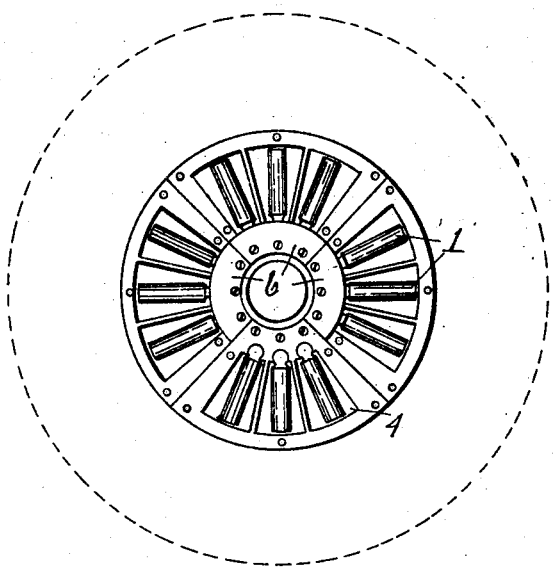
Figure 3:
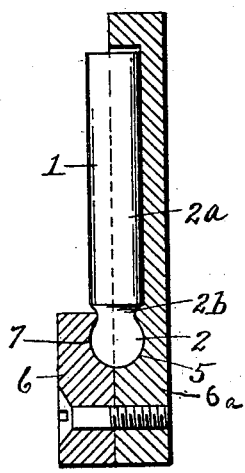
Figure 4:
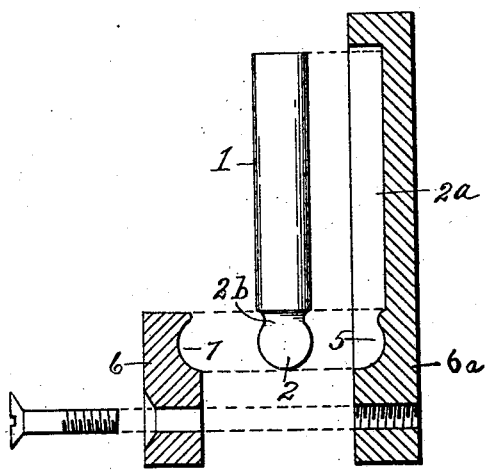

In the drawings:—Figure 1, is a section across the shaft and diametrically through the bearing system. Fig. 2, is a plan view of the bearing cylinders. Fig. 3, is an elevation of a cylinder and a sectional view of the seat in which the cylinder is held. Fig. 4, is a detail drawing of the parts constituting a roller and its seat.

The complete structure in which the invention is embodied embraces the anti-friction rollers of a roller bearing, a cage in which the bodies of the anti-friction rollers are contained, and ball sockets or spherical sockets in which heads connected with the bodies of the anti-friction rollers are held. Each bearing roller 1 has a cylindrical body, from which there projects at one end a spherical head 2 which is connected to the body $2^a$ by neck $2^b$. The body part $2^a$ is held in a compartment or chamber of the cage, which compartment is narrow at that end from which the spherical cavity extends and widens from the farther end of the anti-friction rollers to allow a sufficiency of swing or play to this free end of the roller. That part of the cage which comprises the spherical socket is made in two parts, the base part $6^a$ and the cap piece 6. In the base is one-half of the spherical cavity 7 and in the cap piece is the other half. The head 2 engages in a spherical cavity; the neck $2^b$ of the roller engages in a throat passage 5 and the walls of the throat passage prevent the roller from escaping or from having any freedom of movement at the head end of the roller except freedom to rotate on its axis and to swing on the head.

A bearing plate 8 engages over the rollers, and this bearing plate may be used as a thrust plate for the collar 9 on the shaft, or may be itself secured to the shaft, as may be best adapted for the special purpose to which the bearing is applied.

What I claim is:—

1. A pivotal bearing comprising a cage provided with a plurality of sector shaped chambers having socket cavities at their narrow ends, a roller engaging in each chamber having a globular head freely socketed in each cavity and adapted thereby to permit the said roller to oscillate through the limits of said chamber.

2. The combination of a segmental cage having a plurality of sector shaped chambers, each provided with a semispherical cavity, and a neck passage connecting said cavity with the narrow end of said chamber, a detachable cap plate having semispherical cavities registering with the semispherical cavity of the cage, a roller provided with a globular head socketed in said spherical cavity and adapted to be limited by the swing of the body portion within said chamber.

In testimony whereof, I sign this specification in the presence of two witnesses.

HENRY C. HODGES.

Witnesses:
CHARLES F. BURTON,
VIRGINIA C. SPRATT.